(12) United States Patent
Cho et al.

(10) Patent No.: US 8,521,408 B2
(45) Date of Patent: Aug. 27, 2013

(54) METHOD FOR ESTIMATING REMAINING TRAVEL DISTANCE OF ELECTRIC VEHICLE

(75) Inventors: Il Cho, Incheon (KR); Woo Sung Kim, Gyeonggi-do (KR); Ho Gi Kim, Gyeonggi-do (KR); Ki Taek Sung, Gyeonggi-do (KR); Dong Gil Ha, Gyeonggi-do (KR); Do Sung Hwang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 217 days.

(21) Appl. No.: 13/084,909

(22) Filed: Apr. 12, 2011

(65) Prior Publication Data
US 2012/0143435 A1      Jun. 7, 2012

(30) Foreign Application Priority Data

Dec. 3, 2010   (KR) ................. 10-2010-0122664

(51) Int. Cl.
*G06F 19/00*         (2011.01)
*B60W 10/24*        (2006.01)
*G01M 17/00*        (2006.01)

(52) U.S. Cl.
USPC ........................... 701/123; 180/65.29; 701/29

(58) Field of Classification Search
USPC .............. 701/29, 29.1, 29.4, 31.6, 32.5, 32.7, 701/34.4, 102, 103, 104, 115, 123, 465, 527; 702/176, 177, 182, 187; 180/65.1, 65.275, 180/65.28, 65.285, 65.29; 903/905, 906, 903/907

See application file for complete search history.

(56) References Cited

U.S. PATENT DOCUMENTS

| 5,686,895 A | 11/1997 | Nakai et al. |
| 2012/0116620 A1* | 5/2012 | Wang et al. ..................... 701/22 |
| 2012/0176231 A1* | 7/2012 | Skaff et al. ................... 340/439 |

FOREIGN PATENT DOCUMENTS

| JP | 06189402 A | 7/1994 |
| JP | 09191505 A | 7/1997 |
| JP | 2009089475 A | 4/2009 |
| JP | 2010038754 A | 2/2010 |
| JP | 2010154646 A | 7/2010 |
| KR | 10-2001-0096259 | 11/2001 |

* cited by examiner

*Primary Examiner* — Mary Cheung
*Assistant Examiner* — Rodney Butler
(74) *Attorney, Agent, or Firm* — Edwards Wildman Palmer LLP; Peter F. Corless

(57) ABSTRACT

The present invention provides a method for estimating a distance to empty (DTE) from the present amount of remaining fuel (the amount of remaining electricity) in an electric vehicle. In particular, the present invention provides a method for estimating a remaining travel distance of an electric vehicle, which can efficiently and accurately estimate a remaining travel distance by setting the relationship of a DTE with a state of charge (SOC) of a battery which changes in real time under various load conditions, in consideration of the present travel pattern, in addition to the SOC of a battery and accumulated fuel efficiency for the amount of remaining fuel of the electric vehicle.

14 Claims, 4 Drawing Sheets

METHOD FOR ESTIMATING REMAINING TRAVEL DISTANCE OF ELECTRIC VEHICLE

CROSS-REFERENCE TO RELATED APPLICATION

This application claims under 35 U.S.C. §119(a) the benefit of Korean Patent Application No. 10-2010-0122664 filed Dec. 3, 2010, the entire contents of which are incorporated herein by reference.

BACKGROUND (a) Technical Field

The present invention relates to a system and method for estimating a remaining travel distance of an electric vehicle. More particularly, it relates to a method of estimating a DTE (Distance To Empty) from the amount of the present remaining fuel (the amount of remaining electricity) in an electric vehicle.

(b) Background Art

An electric vehicle can travel by driving motors using electricity charged in a battery. It is very important in an electric vehicle to check its battery state, for example, the present temperature of the battery and the SOC (State Of Charge) of the battery, and manage the battery state to be kept above a predetermined level.

A BMS (Battery Management System), involved in the maintenance of the entire state of the battery, prevents reduction of a battery life due to deterioration of durability. It also helps a vehicle to travel based on its battery states by transmitting the SOC information of the battery to a vehicle controller that controls the battery and its states.

Notably, it is important to check the battery SOC in electric vehicles using a high-voltage battery so that the driver does not end up stranded due to loss of power. Therefore, there is a need for the development of a technology for checking the remaining capacity of the battery thereby informing the driver of its status during vehicle operation.

In the case of the vehicles using common fossil fuel, such as gasoline and diesel, there are well known methods for measuring the amount of fuel remaining in a fuel tank, e.g., a liquid level sensor. The measurement from this liquid level sensor is then used to estimate the DTE based on the amount of fuel remaining in the fuel tank multiplied by an accumulated fuel efficiency.

On the other hand, a typical method of calculating the present SOC of a battery of an electric vehicle during operation is to calculate the present SOC of a battery by measuring the amount of discharged current used per a unit time.

However, estimating the DTE of an electric vehicle from the present amount of remaining capacity of a battery has not been possible at this time due to various technical problems, such as possible risks of providing incorrect information due to difficulty in estimation and presence of estimation errors. Thus, drivers could be stranded through no fault of their own due to inaccurate readings. Accordingly, there is a need for a technique for estimating the DTE of an electric vehicle that provides a greater degree of accuracy than the conventional methods.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a system and method for estimating a remaining travel distance of an electric vehicle, which can simply and accurately estimate a remaining travel distance by setting a relationship of a distance to empty (DTE) with the SOC of a battery which changes in real time under various load conditions, based on the present travel pattern, in addition to the SOC of a battery and accumulated fuel efficiency for the amount of remaining fuel (e.g., electricity) of the electric vehicle.

In one embodiment of the present invention, a method is provided for estimating a remaining travel distance of an electric vehicle. More specifically, this method includes: inputting an initial value of a remaining travel distance and checking an accumulated fuel efficiency right before charging; checking the real time (i.e., present) accumulated fuel efficiency; and loading two or more predetermined functions for estimating a remaining travel distance, in accordance with the accumulated fuel efficiency, and estimating a remaining travel distance for the state of charge (SOC) of a battery by selectively using the functions for estimating a remaining travel distance, using the accumulated fuel efficiency right before charging and the present accumulated fuel efficiency.

In one embodiment, estimating of a remaining travel distance may also include calculating a new accumulated fuel efficiency factor, using the accumulated fuel efficiency right before charging and the present accumulated fuel efficiency, and estimating a remaining travel distance of the SOC of a battery by interpolating the accumulated fuel efficiencies in the two or more functions for estimating a remaining travel distance.

In another embodiment, the initial value of a remaining travel distance may be determined in advance by the accumulated fuel efficiency right before charging, after charging is finished.

In still another embodiment, the method may further include checking and storing the present SOC of a battery, the present accumulated fuel efficiency, and the present remaining travel distance to a storage device, in case an ignition-off order is given by a driver during a vehicle operation.

In yet another embodiment, the checking of the present accumulated fuel efficiency and the estimating of a remaining travel distance for the SOC of a battery may be performed again upon receipt of the ignition-on order given by the driver.

In still yet another embodiment, the functions for estimating a remaining travel distance may be quadratic functions for the SOC of a battery which are set in advance according to the accumulated fuel efficiency.

In a further embodiment, the functions for estimating a remaining travel distance may be three quadratic functions having different gains.

As described above, a method for estimating a remaining travel distance of an electric vehicle, according to the present invention, effectively and accurately estimates the present remaining travel distance of a vehicle by estimating the remaining travel distance in accordance with the present travel pattern, in consideration of the SOC of a battery and the accumulated fuel efficiency, by using a simple control logic.

Further, the method for estimating a remaining travel distance of an electric vehicle according to the present invention is able to accurately estimate a remaining travel distance, by using a simple linear function that can be implemented in embedded type.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
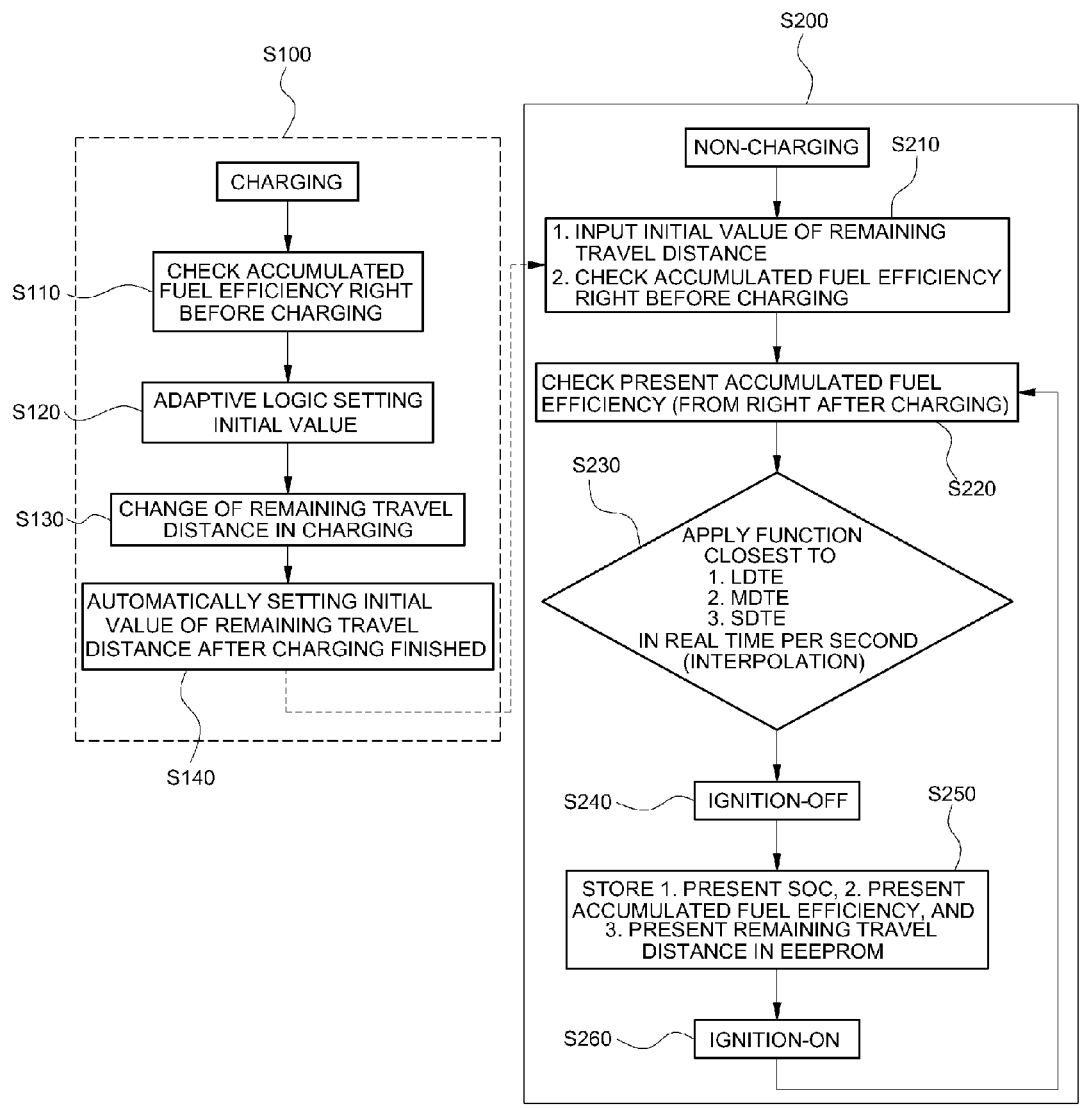
FIG. 1 is a flowchart illustrating a method for estimating a remaining travel distance of an electric vehicle according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Furthermore, although the below examples are described as being part of a method, it is understood that the illustrated embodiment of the present invention may also be embodied as a system or apparatus as well.

EXAMPLES

The following examples illustrate the invention and are not intended to limit the same.

In one embodiment of the present invention, a driver may be provided with reliable information in relation to charging of a vehicle by estimating a distance to empty (DTE) from the amount of the present remaining fuel (e.g., electricity) in an electric vehicle. In particular, the present technique provides a method of estimating a remaining travel distance of an electric vehicle which enables an increased degree of accuracy of an estimate of the real time/present remaining travel distance of the vehicle by using data calculated from accumulated fuel efficiency and the amount of remaining capacity of a high-voltage battery used in the electric vehicle.

The terms used in the specification are used to describe only specific embodiments and are not intended to limit the present invention. The singular forms are intended to include the plural forms unless the context clearly indicates otherwise. It should be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

A technique for estimating a remaining travel distance of an electric vehicle, according to the present invention, is described in detail hereinbelow with reference to the accompanying drawings.

FIG. 1 is a flowchart illustrating the steps of a method for estimating a remaining distance of an electric vehicle according to the present invention.

A method for estimating a remaining travel distance of an electric vehicle is divided into a step relating to a charging state (S100) and a step relating to a non-charging state (S200), and particular, the present invention relates to a method and system for estimating a remaining travel distance of an electric vehicle in the non-charging state (S200), in which the vehicle actually travels.

More specifically, the present invention calculates a remaining travel distance of a vehicle in consideration of accumulated fuel efficiency and the present SOC of a battery while the vehicle travels after being charged.

As shown in FIG. 1, in order to estimate a remaining travel distance in a traveling state after charging is finished, the remaining travel distance in the present traveling state is estimated by, e.g., a controller unit, setting an initial value, calculating an accumulated fuel efficiency, estimating a present SOC of a battery, selecting a function between a remaining travel distance and the SOC of a battery, and calculating a present remaining travel distance.

The process of estimating a remaining travel distance described above is repeated continuously while the vehicle travels, after the initial value for the remaining travel distance is set. Additionally, this process may be performed simultaneously with estimating the SOC of a battery for the present remaining capacity of the battery.

In the flowchart shown in FIG. 1, a step of checking the accumulated fuel efficiency right before charging is performed in the step (S100) that is performed in the charging state, which is a pre-step of the method for estimating a remaining travel distance of an electric vehicle according to the present invention.

More specifically, when the battery is charged, the accumulated fuel efficiency right before the charging is checked (S110). Then a predetermined login for setting an initial value is applied based on the accumulated fuel efficiency (S120). A change in remaining travel distance due to the charging may then be calculated (S130), and the initial value of the remaining travel distance is automatically set, with the charging finished (S140).

The accumulated fuel efficiency in the present invention calculated as a ratio of the movement distance and a change in SOC of a battery each second. That is, this ratio is a value obtained by accumulating, at intervals of a second, the values obtained by calculating a change in a movement distance per second divided by the change in the SOC each second.

Therefore, the accumulated fuel efficiency right before charging is defined as the cumulative total of an estimated change in SOC of a battery and an instant movement distance until the present charging is performed after the previous charging is finished.

The remaining travel distance of a vehicle is information that can be acquired by multiplying the present remaining SOC and the accumulated fuel efficiency (km/SOC). Accordingly, a processor in the system may then calculate and store the current value for the remaining travel distance on a storage device, using the accumulated fuel efficiency right before charging. The term current value is used because in practice there is not a linear relationship between the remaining travel distance and the above two parameters (i.e., the remaining SOC and accumulated fuel efficiency). Thus, the remaining travel distance calculated is only the remaining travel distance at that instance in time or for that time interval represented by the calculation. That is, predicting the remaining travel distance using only one calculation may not be accurate as the remaining travel distance may undergo sudden drastic changes due the each vehicles specific driving circumstances. Alternatively, various methods other than the above method may be used to set the initial value in this step, which is a pre-step of the method for estimating a remaining travel distance of an electric vehicle according to the present invention.

As described above, the pre-step (S100) in the charging state is finished when the vehicle has finished charging and the initial value of the remaining travel distance has been set, and in accordance with the present invention, the step (S200) of estimating a remaining travel distance in the non-charging state is performed to estimate the remaining travel distance that can be traveled by the vehicle.

In estimating a remaining travel distance in the non-charging state, as shown in FIG. 1, as a step of inputting an initial value for the initial remaining travel distance is started and the driver starts and drives the vehicle, the initial value of the remaining travel distance is set in advance, with the charging finished.

Further, this step checks data stored in connection with the accumulated fuel efficiency that was calculated right before charging (S210).

The accumulated fuel efficiency right before charging is then used to selectively apply the function for estimating a remaining travel distance, which is described below, together with the data relating to the present accumulated fuel efficiency that is detected in real time.

Once the initial value relating to the remaining travel distance has been set and the accumulated fuel efficiency right before charging has been checked, the real time/present accumulated fuel efficiency may be calculated according to changes during the traveling of a vehicle (S220).

Further, in the present invention, the present accumulated efficiency may be defined as the ratio of the instant movement distance and an estimated instant change of the present SOC of a battery which is detected in real time after completion of battery charging and start-up of an engine. That is, the present accumulated fuel efficiency may be defined as a value obtained by continuously checking the ratio of an instant movement distance and the instant change of the SOC of a battery, and accumulating the ratio up to present instant in time from the charging.

Therefore, in the present invention, the instant change in SOC of a battery is continuously monitored at predetermined times (or intervals) by estimating the SOC of a battery in real time. Additionally, the present accumulated fuel efficiency is calculated in real time by collecting information on the movement distance during over the same predetermined interval. Therefore, the present accumulated fuel efficiency is the accumulated fuel efficiency calculated from right after charging.

Next, though not shown in FIG. 1, once the present fuel efficiency is calculated, the present SOC of a battery, i.e., a parameter used for the function for estimating a remaining travel distance, may be estimated by, e.g., the controller unit.

In some embodiments of the present invention, the estimation of the SOC may be performed in parallel or independently to estimating the remaining travel distance of the vehicle. By doing so, is possible to receive the results of the estimated SOC of a battery in real time and apply the resulting real time SOC of the battery to the function for estimating a remaining travel distance. Therefore, in this embodiment, estimating the SOC of a battery checking the present accumulated fuel efficiency, and estimating a remaining travel distance may be synchronized at a predetermined time or time intervals and the results may then outputted accordingly.

Further, various methods for estimating the present SOC of a battery may be utilized for estimating the remaining travel distance of an electric vehicle according to the present invention. Further, in the present invention it can be configured to use only the estimated result of the SOC of a battery to calculate the remaining travel distance, without any limitation regarding the method for estimating the SOC of a battery.

Meanwhile, since the present SOC of a battery according to the present invention can be estimated by a logic implemented on, e.g., a controller for estimating the SOC of a battery, a step of estimating a remaining travel distance may be performed by selectively using a predetermined function for estimating a remaining travel distance, when the present SOC of a battery has been inputted (S230).

An exemplary function for estimating a remaining travel distance used in the present invention may be experimentally acquired based on the SOC of a battery and the accumulated fuel efficiency, and implemented as an n-th function of a remaining travel distance for the SOC of a battery. In particular, the function in most embodiments has a gain for the SOC of a battery calculated based on the accumulated fuel efficiency.

In the function for estimating a remaining travel distance, the present embodiment outputs the result obtained from repeated experiments in a linear function by inputting the SOC of a battery, the travel distance, and the accumulated fuel efficiency, by using a neural network tool. In particular, the present invention calculates two or more functions for estimating a remaining travel distance, according to different travel patterns.

The functions for estimating a remaining travel distance have gains of different SOC of batteries, which consider the different travel patterns, and the gains are calculated by applying different accumulated fuel efficiencies in accordance with the travel patterns, as described above.

Meanwhile, the function for estimating a remaining travel distance is set as a function which may converge in a quadratic function, as in the following exemplary Formula 1, in consideration of the volume and the process speed of the used logic, and the quadratic function for estimating a remaining travel distance can be implemented in embedded type and can estimate the actual remaining travel distance with a very small degree of error.

$$DTE_1(km) = gain1_1 \times SOC_1^2 + gain2_1 \times SOC_1 + gain3_1 \qquad \text{[Formula 1]}$$

Therefore, the method for estimating the remaining travel distance of an electric vehicle according to exemplary embodiment of the present invention is provided with a quadratic function, such as Formula 1, and preferably provided with three functions for estimating the remaining travel distance which are determined in accordance with three different accumulated fuel efficiencies.

The three functions for estimating the remaining travel distance are determined in advance such that they have relative differences in the estimated values of the remaining travel distance in accordance with the used accumulated fuel efficiencies, and in some embodiment of the present invention, it is possible to calculate the closest estimated value by selectively using the three functions for estimating the remaining travel distance.

For example, as described in connection with the step S230 shown in FIG. 1, the three functions for estimating a remaining traveling distance are divided into a long distance to empty (LDTE), a middle distance to empty (MDTE) and a short distance to empty (SDTE). Accordingly, the remaining travel distance may be estimated utilizing these three functions.

Therefore, in the method for estimating the remaining travel distance of an electric vehicle according to an embodiment of the present invention, the predetermined three functions for estimating the remaining travel distance are loaded, and a function for estimating the remaining travel distance for accumulated fuel efficiency close to the present accumulated fuel efficiency calculated in the previous step is selected and used.

However, in the present invention, when the present accumulated fuel efficiency and the present SOC of a battery are used to estimate the remaining travel distance, an excessive change is temporarily generated by nonlinearity of the two factors and a large error is generated in estimating the remaining travel distance. Accordingly, a new accumulated fuel efficiency factor is calculated and used to select the function for estimating the remaining travel distance, by applying the accumulated fuel efficiency right before charging, which has been checked in the initial step, together with the present accumulated fuel efficiency, in the present invention.

The new accumulated fuel efficiency calculated as described above may be implemented to be calculated in accordance with the movement distance ratios accumulated in the present accumulated fuel efficiency and the accumulated fuel efficiency right before charging. More specifically, the new accumulated fuel efficiency may be determined by calculating a new accumulated fuel efficiency factor by applying the accumulated fuel efficiency right before charging to the present accumulated fuel efficiency.

Alternatively, the method for estimating the remaining travel distance of an electric vehicle according to another embodiment of the present invention may be implemented to calculate the remaining travel distance for the SOC of a battery by selecting one or two close functions for estimating the remaining travel distance, using the factors of the present SOC of a battery and the calculated accumulated fuel efficiency, from the three predetermined functions for estimating the remaining travel distance, and then using an interpolation according to the new accumulated fuel efficiency factor based on the corresponding SOC of a battery, in order to improve the accuracy in estimating the remaining travel distance.

The steps of checking the present accumulated fuel efficiency and selectively applying the functions for estimating a remaining travel distance, which have been described above, are repeated at predetermined time periods or intervals while the vehicle travels, and the estimated value of the remaining travel distance calculated by the repetition may be outputted to the outside.

Meanwhile, as shown in FIG. 1, when the vehicle is stopped and an ignition-off order is made by the driver (S240), and the real-time estimation of the remaining travel distance described above is finished, the present SOC of a battery, the present accumulated fuel efficiency, and the present remaining travel distance are then stored in a storage unit, such as an Electrically Erasable Programmable Read-Only Memory (EEPROM), and the estimation of a remaining travel distance of an electric vehicle according to the present invention is completed (S250).

Further, when an ignition-on order is made by the driver to restart the vehicle (S260), the remaining travel distance stored with the ignition-off order in the storage is set as an initial value and an estimation of a remaining travel distance is started again with the step of checking the present accumulated fuel efficiency described above (S220~S230).

Alternatively, when the battery is charged again before the vehicle is started, unlike the case described above, the process returns to the step of estimating a remaining travel distance in the non-charging state (S100), which is the pre-step, and the method for estimating the remaining travel distance of an electric vehicle according to the present invention is sequentially performed by setting a remaining travel distance after charging has finished, as shown in FIG. 1.

Figure 2A:
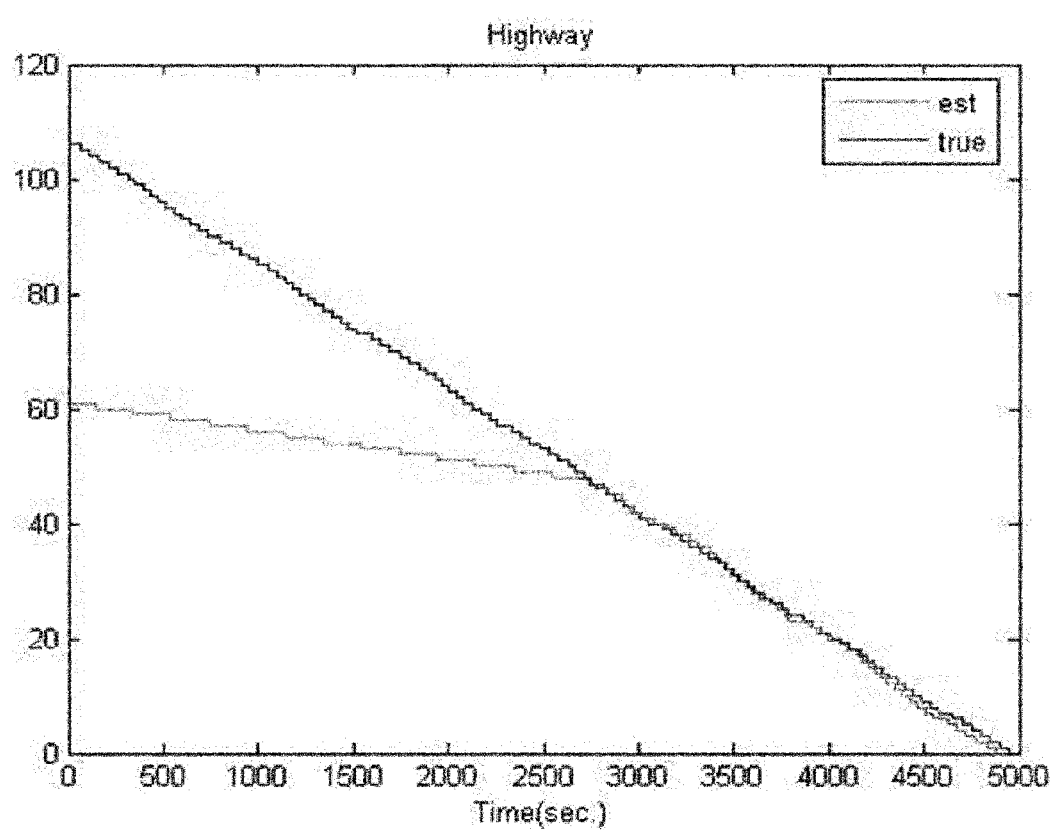
FIGS. 2A to 2C are graphs comparing estimated values (est) of a remaining travel distance with actual values (true) of a DTE by using a method for estimating a remaining travel distance of an electric vehicle according to an exemplary embodiment of the present invention.
Figure 2B:
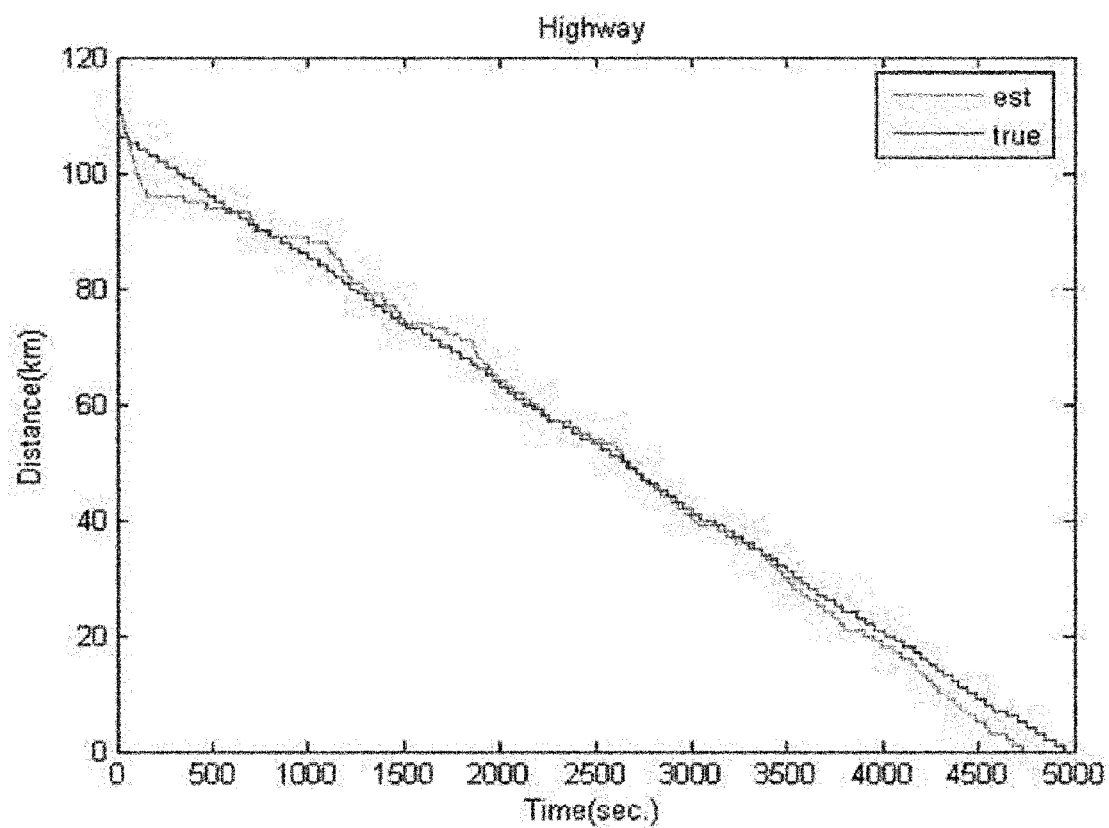
Figure 2C:
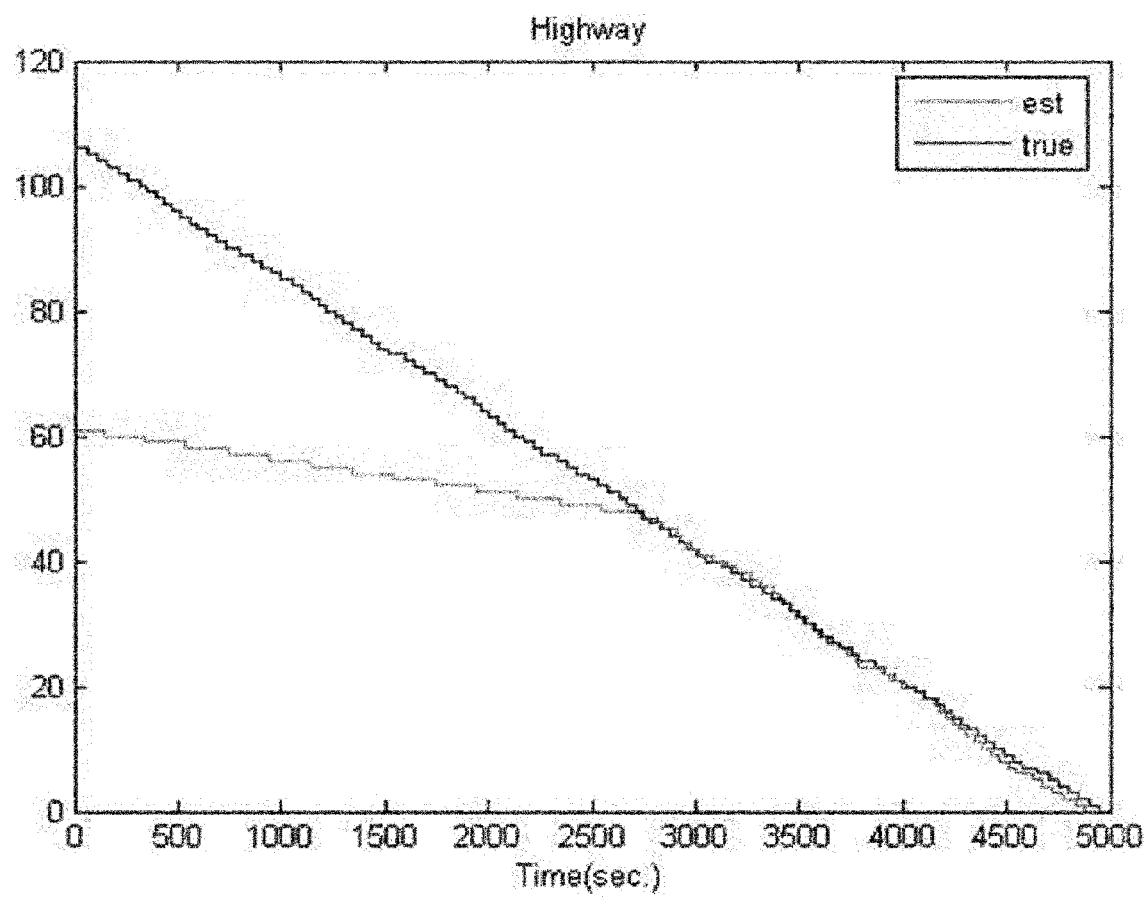

FIGS. 2A to 2C are exemplary graphs comparing estimated values (est) of a remaining travel distance with actual values (true) of a remaining travel distance by using the methods described above.

The graphs shown in FIGS. 2A to 2C represent the results obtained when applying the same estimation test of a remaining travel distance to a vehicle that has learned different travel states before charging. The difference in initial values in the graphs is because the accumulated fuel efficiencies right before charging is different due to the difference in travel states before charging in the tests. Therefore, as a result of learning the different travel states, the initial state was set at 150 km in FIG. 2A, at 100 km in FIG. 2B, and at 60 km at FIG. 2C, respectively.

Advantageously, according to the present invention, it is possible to achieve a greater degree of accuracy of the estimated results that converge to the actual remaining travel distance, by calculating the estimated values of the remaining travel distance, and using an interpolation of the accumulated fuel efficiencies in the three functions for estimating the remaining travel distance, regardless of the difference in initial charging values.

As stated above, the illustrated embodiment of the present invention may be embodied as a system as well. That is, in one embodiment of the present invention, a system for estimating a remaining travel distance of an electric vehicle may be embodied as a controller unit that is configured to input an initial value of the remaining travel distance, determine an accumulated fuel efficiency right before charging, determine the present accumulated fuel efficiency, load two or more predetermined functions for estimating the remaining travel distance based on the accumulated fuel efficiency, and estimate the remaining travel distance for a state of charge (SOC) of a battery by selectively using the two or more functions for estimating the remaining travel distance, the accumulated fuel efficiency right before charging and the present accumulated fuel efficiency.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for estimating a remaining travel distance of an electric vehicle, comprising:

inputting, by a controller unit, an initial value of the remaining travel distance and checking an accumulated fuel efficiency right before charging of the electric vehicle;

checking, by the controller unit, a present accumulated fuel efficiency; and loading, by the controller unit, two or more predetermined functions for estimating the remaining travel distance, in accordance with the accumulated fuel efficiency right before charging of the electric vehicle, and estimating the remaining travel distance for a state of charge (SOC) of a battery by selectively using the two or more functions for estimating the remaining travel distance, using the accumulated fuel efficiency right before charging and the present accumulated fuel efficiency.

2. The method of claim 1, wherein the estimating of the remaining travel distance calculates a new accumulated fuel efficiency factor, using the accumulated fuel efficiency right before charging and the present accumulated fuel efficiency, and estimates a remaining travel distance of the SOC of a battery by interpolating the accumulated fuel efficiency right before charging and the present accumulated fuel efficiency in the two or more functions for estimating a remaining travel distance.

3. The method of claim 1, wherein the initial value of a remaining travel distance is determined in advance by the accumulated fuel efficiency right before charging, after charging is finished.

4. The method of claim 1, further comprising:
checking and storing a present SOC of a battery, the present accumulated fuel efficiency, and a present remaining travel distance to a storage device, when an ignition-off order is given by a driver during a vehicle operation.

5. The method of claim 1, wherein the functions for estimating a remaining travel distance are quadratic functions for the SOC of a battery which is set in advance according to the accumulated fuel efficiency right before charging.

6. The method of claim 1, wherein the two or more predetermined functions for estimating a remaining travel distance are quadratic functions for the SOC of a battery which is set in advance according to the accumulated fuel efficiency right before charging.

7. The method of claim 4, wherein the checking of the present accumulated fuel efficiency and the estimating of a remaining travel distance for the SOC of a battery are performed again upon receipt of an ignition-on order given by the driver.

8. The method of claim 5, wherein the functions for estimating a remaining travel distance are three quadratic functions having different gains.

9. A system for estimating a remaining travel distance of an electric vehicle, comprising:
a controller unit configured to
input an initial value of the remaining travel distance,
determine an accumulated fuel efficiency right before charging of the electric vehicle,
determine a present accumulated fuel efficiency,
load two or more predetermined functions for estimating the remaining travel distance based on the accumulated fuel efficiency right before charging of the electric vehicle, and
estimate the remaining travel distance for a state of charge (SOC) of a battery by selectively using the two or more functions for estimating the remaining travel distance, the accumulated fuel efficiency right before charging and the present accumulated fuel efficiency.

10. The system of claim 9, wherein the controller is further configured to calculate a new accumulated fuel efficiency factor, using the accumulated fuel efficiency right before charging and the present accumulated fuel efficiency, and estimate a remaining travel distance of the SOC of a battery by interpolating the accumulated fuel efficiency right before charging and the present accumulated fuel efficiency in the two or more functions for estimating a remaining travel distance.

11. The system of claim 9, wherein the initial value of a remaining travel distance is determined in advance by the accumulated fuel efficiency right before charging, after charging is finished.

12. The system of claim 9, wherein the controller is further configured to:
check and store the present SOC of a battery, a present accumulated fuel efficiency, and a present remaining travel distance on a storage device, when an ignition-off order is given by a driver during a vehicle operation.

13. The system of claim 9, wherein the functions for estimating a remaining travel distance are quadratic functions for the SOC of a battery which is set in advance according to the accumulated fuel efficiency right before charging.

14. The system of claim 13, wherein the functions for estimating a remaining travel distance are three quadratic functions having different gains.

* * * * *